US012762617B2

(12) United States Patent
Kow et al.

(10) Patent No.: US 12,762,617 B2
(45) Date of Patent: Oct. 13, 2026

(54) METHOD AND SYSTEM OF CHARGING ELECTRIC VEHICLE IN AN ELECTRIC VEHICLE CHARGING STATION

(71) Applicant: LITE-ON SINGAPORE PTE. LTD., Singapore (SG)

(72) Inventors: Ken-Weng Kow, Singapore (SG); Binte Ahmad Jefri Hamimah, Singapore (SG); Zhi-Ming Zhong, Singapore (SG); Jing Yang, Singapore (SG); En Cheng Benjin Lau, Singapore (SG)

(73) Assignee: LITE-ON SINGAPORE PTE. LTD., Singapore (SG)

( * ) Notice: Subject to any disclaimer, the term of this patent is extended or adjusted under 35 U.S.C. 154(b) by 303 days.

(21) Appl. No.: 18/631,082

(22) Filed: Apr. 10, 2024

(65) Prior Publication Data

US 2025/0153595 A1 May 15, 2025

(30) Foreign Application Priority Data

Nov. 9, 2023 (SG) ............................ 10202303192S

(51) Int. Cl.
*G06Q 40/04* (2012.01)
*B60L 53/30* (2019.01)
(Continued)

(52) U.S. Cl.
CPC ............ *G06Q 40/04* (2013.01); *B60L 53/305* (2019.02); *B60L 53/62* (2019.02); *B60L 53/63* (2019.02);
(Continued)

(58) Field of Classification Search
None
See application file for complete search history.

(56) References Cited

U.S. PATENT DOCUMENTS 8,509,976 B2 8/2013 Kempton
9,026,347 B2 * 5/2015 Gadh ...................... B60L 53/67 320/132
(Continued)

FOREIGN PATENT DOCUMENTS

WO WO2023016655 A1 2/2023

OTHER PUBLICATIONS

Cao, Yue, et al. “Mobile edge computing for big-data-enabled electric vehicle charging.” IEEE Communications Magazine 56.3 (2018): 150-156. (Year: 2018).*
Li, Junlong, et al. “Edge-cloud computing systems for smart grid: state-of-the-art, architecture, and applications.” Journal of Modern Power Systems and Clean Energy 10.4 (2022): 805-817. (Year: 2022).*
(Continued)

*Primary Examiner* — Carlos R Ortiz Rodriguez
(74) *Attorney, Agent, or Firm* — WPAT, PC

(57) ABSTRACT

A method for charging electric vehicle (EV) at an electric vehicle charging station equipped with a number of electric vehicle supply equipments (EVSEs) is provided. Charging at least one EV by the EVSEs is performed under control of a cloud controller. Whether a total power consumption corresponding to the EVSEs is equal or larger than X % of a maximum power capacity is determined. X is a real number. When the determination is yes, amount of power for each EVSE is recalculated by an edge controller and the recalculated amount of power is assigned to each EVSE by the edge controller for charging the at least one EV by the EVSEs under control of the edge controller. Charging information of each EVSE is sent to the cloud controller by the edge controller when performing charging the at least one EV by the EVSEs under control of the edge controller.

22 Claims, 4 Drawing Sheets

(51) Int. Cl.

| | |
|---|---|
| ***B60L 53/62*** | (2019.01) |
| ***B60L 53/63*** | (2019.01) |
| ***B60L 53/65*** | (2019.01) |
| ***B60L 53/66*** | (2019.01) |
| ***B60L 53/67*** | (2019.01) |
| ***B60L 53/68*** | (2019.01) |
| ***G06Q 50/06*** | (2012.01) |
| ***H02J 3/00*** | (2006.01) |

(52) U.S. Cl.

CPC ............. *B60L 53/65* (2019.02); *B60L 53/665* (2019.02); *B60L 53/67* (2019.02); *B60L 53/68* (2019.02); *G06Q 50/06* (2013.01); *H02J 3/003* (2020.01); *G06Q 2240/00* (2013.01)

(56) References Cited

U.S. PATENT DOCUMENTS

| | | | | |
|---|---|---|---|---|
| 10,836,275 | B2 | 11/2020 | Zhu | |
| 11,130,421 | B2 | 9/2021 | Marcial-Simon et al. | |
| 11,784,491 | B1 | 10/2023 | Ewing et al. | |
| 2019/0126775 | A1* | 5/2019 | Han | B60L 3/12 |
| 2020/0013747 | A1 | 1/2020 | Yamada et al. | |
| 2022/0215488 | A1 | 7/2022 | Uyeki et al. | |
| 2022/0348105 | A1 | 11/2022 | Sujan et al. | |

OTHER PUBLICATIONS

Search report issued by European Patent Office on Nov. 13, 2024.

Search report issued by European Patent Office on Apr. 2, 2025.

* cited by examiner

METHOD AND SYSTEM OF CHARGING ELECTRIC VEHICLE IN AN ELECTRIC VEHICLE CHARGING STATION

This application claims the benefit of Singapore provisional application Serial No. 10202303192S, filed Nov. 9, 2023, the disclosure of which is incorporated by reference herein in its entirety.

TECHNICAL FIELD

The disclosure relates to a method and system of charging electric vehicle (EV) in an electric vehicle charging station.

BACKGROUND

International endeavors aimed at mitigating global warming have commenced, propelling the advancement of electric vehicles (EVs) towards the objective of obviating fuel consumption. The charging equipment industry is noticing the trend toward vehicle electrification and is actively establishing a growing number of charging stations designed to facilitate broader access for drivers to charge their EVs.

As EVs become increasingly prevalent, there arises a pressing need for efficient energy demand management. The charging of EVs may result in considerable stain on the grid infrastructure, especially during peak hours when the demand for energy is quite high. For example, the charging of EVs may lead to an increase in the load on the grid, exceeding its designed capacity in certain areas or at certain times. Such a scenario could result in issues like grid overload, voltage instability, or equipment damage, thereby affecting the stable operation of the grid. Therefore, managing the charging of EVs is needed to reduce the strain on the grid infrastructure and ensure the reliability and stability of the power system.

Besides, efforts to minimize or potentially eliminate the costs associated with infrastructure upgrade are also necessary.

SUMMARY

According to one embodiment, a method for charging electric vehicle (EV) at an electric vehicle charging station equipped with a number of electric vehicle supply equipments (EVSEs) is provided. The method includes the following steps. Charging at least one EV by the EVSEs is performed under control of a cloud controller. Whether a total power consumption corresponding to the EVSEs is equal or larger than X % of a maximum power capacity is determined. X is a real number between 1 and 100. When the total power consumption corresponding to the EVSEs is equal or larger than X % of the maximum power capacity, amount of power for each EVSE is recalculated by an edge controller and the recalculated amount of power is assigned to each EVSE by the edge controller for charging the at least one EV by the EVSEs under control of the edge controller. Charging information of each EVSE is sent to the cloud controller by the edge controller when performing charging the at least one EV by the EVSEs under control of the edge controller.

According to another embodiment, a system for charging EV at an electric vehicle charging station equipped with a number of EVSEs is provided. The system includes a cloud controller and an edge controller. The cloud controller is configured to control the EVSEs to perform charging at least one EV. The edge controller is configured to perform the following procedures. Whether a total power consumption corresponding to the EVSEs is equal or larger than X % of a maximum power capacity is determined. X being a real number between 1 and 100. When the total power consumption corresponding to the EVSEs is equal or larger than X % of the maximum power capacity, amount of power for each EVSE is recalculated and the recalculated amount of power is assigned to each EVSE for charging the at least one EV by the EVSEs under control of the edge controller. Charging information of each EVSE is sent to the cloud controller when performing charging the at least one EV by the EVSEs under control of the edge controller.

Figure 1:
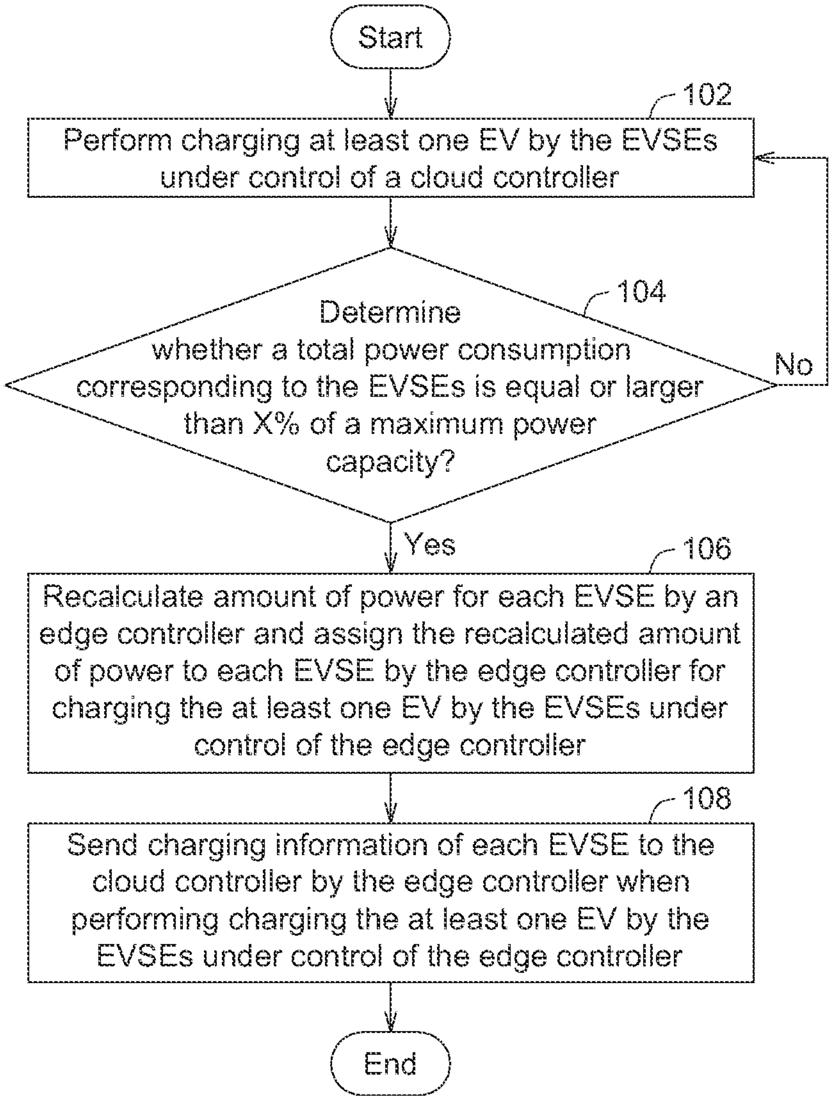
FIG. 1 illustrates a flowchart for a method for charging electric vehicle (EV) at an electric vehicle charging station equipped with a number of electric vehicle supply equipments (EVSEs) according to an embodiment of the disclosure.

In the following description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a flowchart for a method for charging electric vehicle (EV) at an electric vehicle charging station equipped with a number of electric vehicle supply equipments (EVSEs) according to an embodiment of the disclosure is illustrated. In step 102, charging at least one EV by the EVSEs is performed under control of a cloud controller. In step 104, whether a total power consumption corresponding to the EVSEs is equal or larger than X % of a maximum power capacity is determined. X is a real number between 1 and 100. When the total power consumption corresponding to the EVSEs is equal or larger than X % of the maximum power capacity, step 106 is entered. Otherwise, return to step 102. In step 106, an edge controller recalculates amount of power for each EVSE and assigns the recalculated amount of power to each EVSE for charging the at least one EV by the EVSEs under control of the edge controller. Then, step 108 is entered, and the edge controller sends charging information of each EVSE to the cloud controller when performing charging the at least one EV by the EVSEs under control of the edge controller as a copy to determine the calculation of the power allocated to each EVSE at the next time iteration. This method will be described in more detail as follows.

Figure 2:
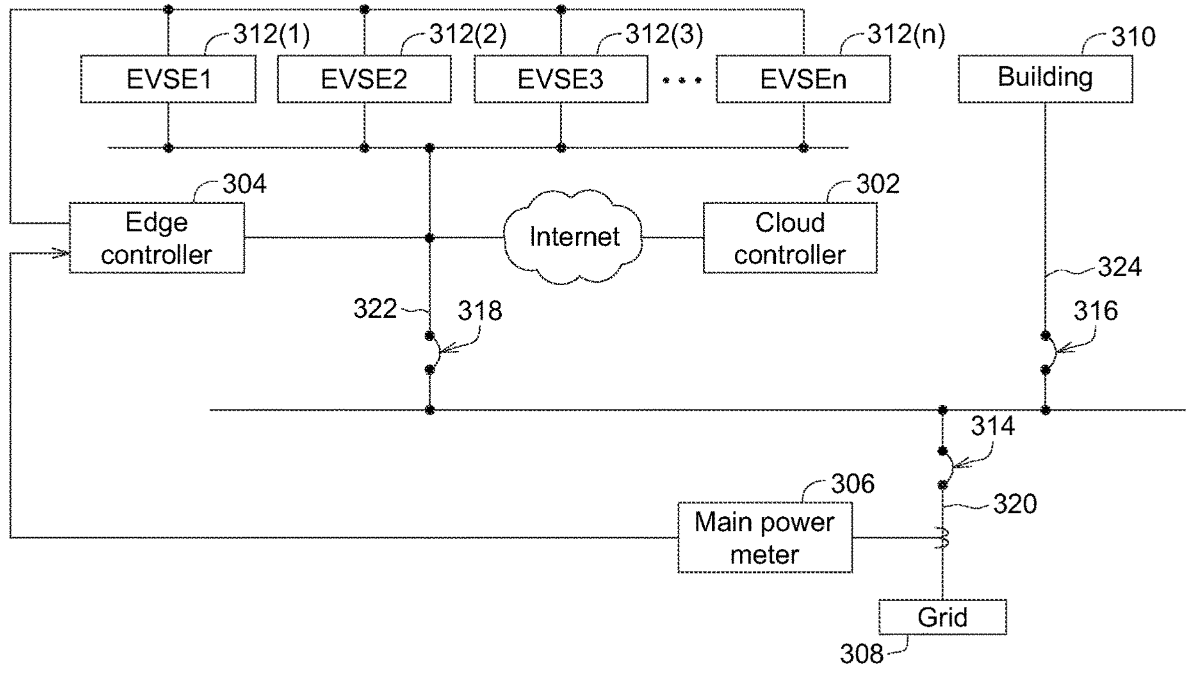
FIG. 2 shows a block diagram of a system for charging EV at an electric vehicle charging station equipped with a number of EVSEs according to an embodiment of the disclosure.
Figure 3:
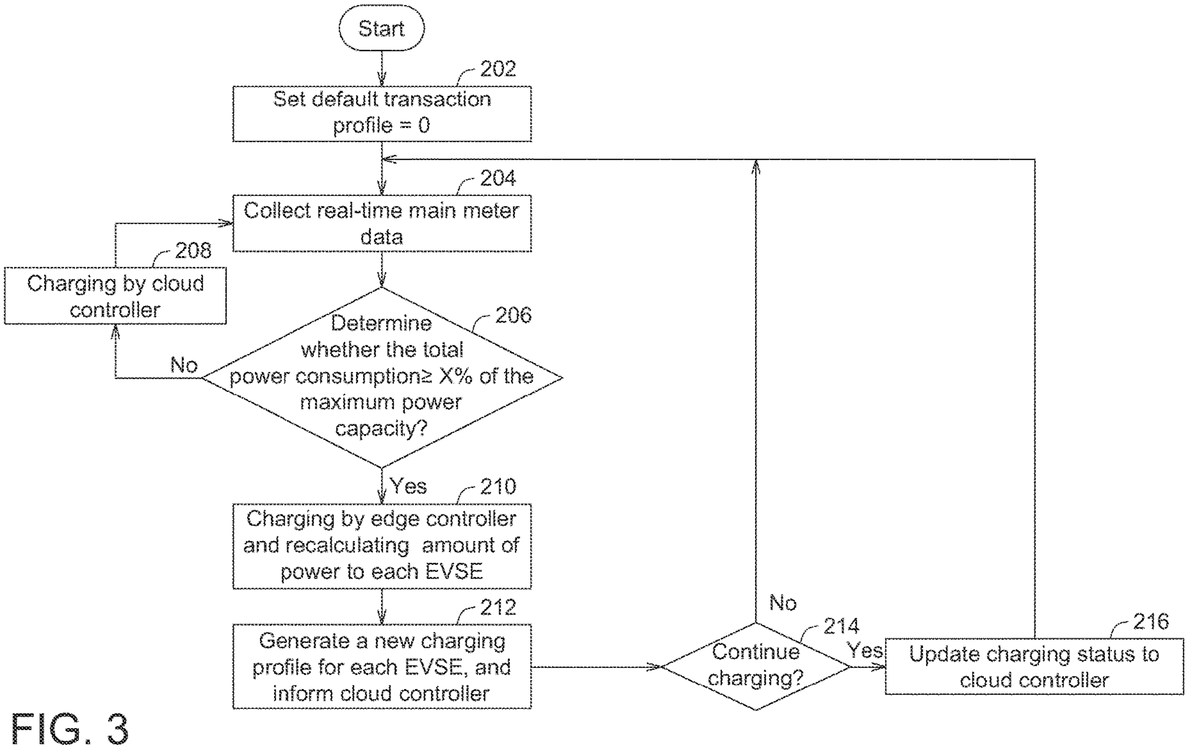
FIG. 3 shows a detailed flowchart of the method for charging EV at an electric vehicle charging station equipped with a number of EVSEs according to an embodiment of the disclosure.

Referring to FIG. 2 and FIG. 3, FIG. 2 shows a block diagram of a system for charging EV at an electric vehicle charging station equipped with a number of EVSEs according to an embodiment of the disclosure, and FIG. 3 shows a detailed flowchart of the method for charging EV at an electric vehicle charging station equipped with a number of EVSEs according to an embodiment of the disclosure. The system of charging EV in an electric vehicle charging station includes, for example, a cloud controller 302 and an edge controller 304, as shown in FIG. 2.

In FIG. 2, an EV charging system environment is illustrated. The grid 308 supplies power to loads such as EVSE1 312(1) to EVSEn 312(*n*) and the building 310. Additionally, renewable energy sources can contribute power to these loads, potentially even exporting excess energy to the grid 308 when load demand is lower than the renewable energy generated. To cope with high load demand, an energy storage system (ESS) might also be employed to provide supplemental energy to the loads.

The main power meter 306, which can be implemented by a digital power meter, may detect import and export of energy for the entire infrastructure at a time interval. Additionally, each renewable energy source and ESS may be equipped with its own digital power meter. Each EVSE has the capability to monitor its individual energy usage sourced from the grid 308. Each EVSE is also capable of monitoring its own energy exported to the grid 308, if applicable.

The edge controller 304 is capable of collecting data from each EVSE 312 and the main power meter 306, such as import/export values. Utilizing this information, the edge controller 304 can execute a smart charging algorithm to implement dynamic load management (DLM) algorithm when power crunch occurs.

The dynamic load management adjusts the power allocation for each phase (namely, phase L1, phase L2, and phase L3) of every EVSE in real-time, based on the actual electricity demand of the building. The power allocation is performed with ensuring that the current in power allocation does not exceed the current limit for each phase, thus enabling the optimization of energy usage and prevent grid 308 overloaded. The dynamic load management will be elaborated further with the flow chart provided in FIG. 3.

As shown in FIG. 3, in step 202, a default transaction profile of each EVSE is set to zero. The transaction profile of each EVSE indicates the power value or current value for each EVSE, for example, used to charge the corresponding EV by the corresponding EVSE. In step 204, real-time main meter data is collected. That is, the real-time main meter data is obtained from the main power meter 306 at a fixed interval.

The EVSEs 312(1) to 312(*n*) and a building 310 are provided with power through a power line 320 from the grid 308. The total power consumption corresponding to the EVSEs 312(1) to 312(*n*) is the difference between the total power consumption along the power line 320 and power consumption for the building 310, or between the X % of the maximum power capacity and power consumption for the building 310. In this situation, the EVSEs 312(1) to 312(*n*) are provided with power through a power line 322 and the power line 320 and breakers 318 and 314 from the grid 308, and the building 310 is provided with power through a power line 324 and the power line 320 and breakers 316 and 314 from the grid 308, as shown in FIG. 2.

In some embodiment, the total power consumption corresponding to the EVSEs is power consumption for the building which includes power consumption for the EVSEs. In this situation, the EVSEs are located inside the building and the EVSEs and the building are provided with power through the same power line (not shown) from the grid.

In step 206, whether the total power consumption corresponding to the EVSEs is equal or larger than X % of the maximum power capacity is determined. In some embodiment, whether the total power consumption corresponding to the EVSEs is equal or larger than X % of the maximum power capacity can be determined according to the obtained real-time main meter data from the main power meter 306. The main power meter 306 may detect the current flowing through the power line 320, detect the power delivered on the power line 320, or detect the voltage on the power line 320. Since the current flowing through the power line 320 may flow to EVSE1 312(1) to EVSEn 312(*n*) and building 310 and the power delivered through the power line 320 may be delivered to EVSE1 312(1) to EVSEn 312(*n*) and building 310, the real-time main meter data is related to the total power consumption corresponding to the EVSEs.

The real-time main meter data may include at least one of real-time energy consumption data, voltage levels and current levels of each phase of the power provided by the grid, and energy usage over time. The maximum power capacity is, for example, a maximum power capacity of a grid infrastructure of the grid 308.

In step 206, when the total power consumption corresponding to the EVSEs is equal or larger than X % of the maximum power capacity, then the method proceeds to step 210. Otherwise, the method proceeds to step 208. In step 208, charging by the cloud controller 302 is performed. That is, charging at least one EV by the EVSEs is performed under control of the cloud controller 302.

When the total power consumption corresponding to the EVSEs is not equal or not larger than X % (for example, 90%) of the maximum power capacity, it means that there is no power crunch and default charging by cloud controller shall commence until there is a power crunch. Therefore, in step 208, the cloud controller 302 may perform the following smart charging procedures with using AI engine, for example. The cloud controller 302 generates a charging prediction data obtained according to a number of historical charging data. Each historical charging data includes an actual charging amount and at least one of a stay time of each EV and a charging time of each EV. The cloud controller 302 obtains a predicted electricity demand and a predicted stay period of each EV through the charging prediction data. The cloud controller 302 can further generate a charging schedule, including providing each EV with a basic charging power amount. The cloud controller 302 can also determine a charging priority of each EV according to the predicted electricity demand and the predicted stay period using the AI engine.

In step 210, charging by the edge controller 304 is performed. When the total power consumption corresponding to the EVSEs is equal or larger than X % (for example, 90%) of the maximum power capacity, it means that there is a power crunch and dynamic load management shall be activated. In the process of the dynamic load management, charging by the cloud controller 302 is changed to charging by the edge controller 304. Therefore, in step 210, charging at least one EV by the EVSEs is performed under control of the edge controller 304. The edge controller 304 performs dynamic load management by recalculating available power to each EVSE, and evenly distribute power to each EVSE by assigning appropriate amount of power to each line for each EVSE for charging each EVSE and update new charging profile to each EVSE.

That is to say, in step 210, the edge controller 304 recalculates amount of power for each EVSE and assigns the recalculated amount of power to each EVSE for charging the at least one EV by the EVSEs under control of the edge controller 304. In some embodiment, each EVSE is assigned with power evenly. For example, each EVSE is assigned with the same power, the same current, or the same ratio (the ratio of individual received power of the EVSE to individual maximum received power of the EVSE). The electricity charged to the battery of EV can be measured in the unit of work, and its unit is, for example, kilowatt hours (kWh) or other work units.

After step 210, step 212 are performed. In step 212, the edge controller 304 updates the charging profile for each EVSE by generating a new charging profile for each EVSE and sending the new charging profile to each EVSE. The new charging profile indicates the assigned and recalculated amount of power, or current, for each EVSE.

Besides, in step 212, the edge controller 304 further sends charging information of each EVSE to the cloud controller 302 when performing charging the at least one EV by the EVSEs 312(1) to 312(*n*) under control of the edge controller 304. The charging information of each EVSE sent to the cloud controller 302 by the edge controller 304 is used as a new historical charging data used by the cloud controller 302 for generating another charging prediction data for charging the at least one EV by the EVSEs 312(1) to 312(*n*) under control of the cloud controller 302 in a next time iteration.

The charging information of each EVSE includes, for example, at least one of charging status of each EV, maximum charging current or charging power of each EVSE, charging current or charging power amount of each EV, and time period of stay of each EV.

After step 212, step 214 is performed. In step 214, whether charging is continued using the same charging profile for each EVSE is determined. If yes, then step 216 is entered; if not, then return to step 204. In step 216, the edge controller 304 updates charging status of each EVSE and sends the updated charging status of each EVSE to the cloud controller 302. The charging status of each EVSE indicates whether the corresponding EVSE is still in the status of charging. After step 216, step 204 is entered.

When the determination in step 214 is No, step 204 is performed again, and real-time main meter data is collected again for the next time iteration.

Figure 4:
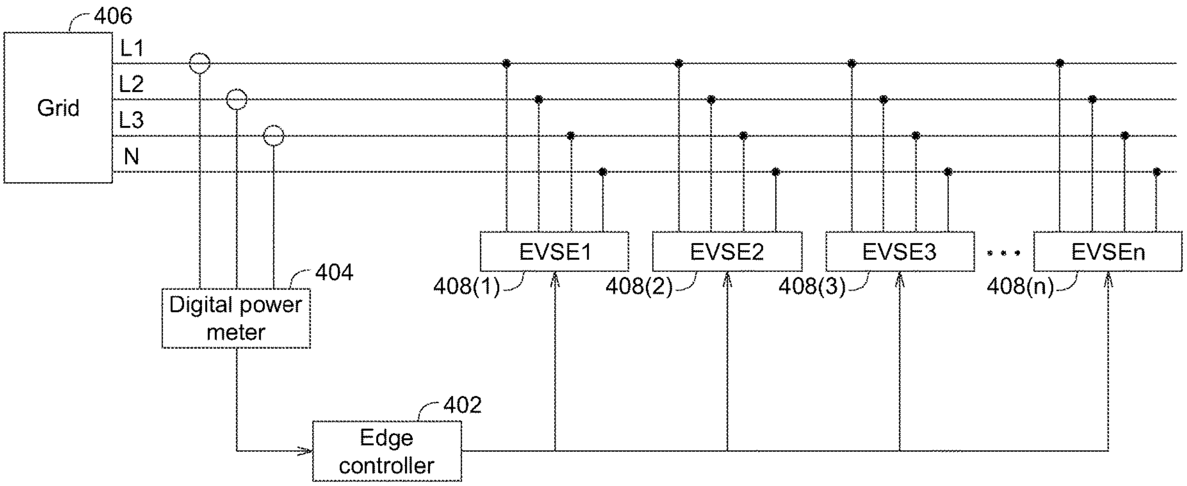
FIG. 4 shows a block diagram of part of the system for charging EV at an electric vehicle charging station provided with three-phase electrical power from grid according to an embodiment of the disclosure.

Refer to FIG. 4, which shows a block diagram of part of the system for charging EV at an electric vehicle charging station provided with three-phase electrical power from grid according to an embodiment of the disclosure. FIG. 4 illustrates an example of network of EVSEs connected to the same edge controller 402, represented in TPN (Three Pole Neutral) or 4P (Four Pole) system.

Data from each EVSE may include, but not limited to, charging status of each EVSE, charging current or charging power amount of each EV, and charging priority of each EVSE. Load sharing takes into consideration of each phase (that is, phases L1, L2, and L3). Each EVSE may be connected to each phase separately.

The main power meter may be implemented by a digital power meter 404, which can read grid information at each phase. Edge controller 402 can assign power allocation to each EVSE separately at each phase. Edge controller 402 can read data from the digital power meter 404 and EVSEs 408(1) to 408(*n*).

Dynamic load management is applied based on, and not limited to, the following: energy consumption data (for example, the energy consumption data of facilities and EVSEs), amount of electrical performance data (for example, voltage, current, and power quality) recalculated by the edge controller 402, EV charging prioritization (for example, VIP account), energy consumption patterns data (that is, historical data), and day-ahead schedule (that is, time-of-use pricing, day-ahead pricing, and real-time pricing).

In detail, grid 406 provides electrical power of phase L1, phase L2, and phase L3. The digital power meter 404 detects the voltage on the line for phase L1, the voltage on the line for phase L2, and the voltage on the line for phase L3. In some embodiment, the digital power meter 404 detects the current flowing through the line for phase L1, the current flowing through the line for phase L2, and the current flowing through the line for phase L3. In some embodiment, the digital power meter 404 detects the power on the line for phase L1, the power on the line for phase L2, and the power on the line for phase L3.

Normally, charging at least one EV by the EVSEs is performed under control of a cloud controller. When the total power consumption corresponding to the EVSEs in a particular phase of power (for example, one of phases L1 to L3) is equal or larger than X % of the maximum power capacity, the edge controller 402 recalculates amount of current or power in the particular phase for each particular EVSE which uses current or the power in the particular phase, and assigns the recalculated amount of power in the particular phase to each particular EVSE for charging the at least one EV by the particular EVSEs. Afterward, when the total power consumption corresponding to the EVSEs in the particular phase of power (for example, one of phases L1 to L3) is changed to be less than X % of the maximum power capacity, the edge controller 402 will inform the cloud controller and then charging at least one EV by the EVSEs is changed to be performed under the control of the cloud controller. By doing so, the power consumption in the particular phase of power which is originally equal or larger than X % of the maximum power capacity can be reduced, and the load balancing among three phases can be achieved.

According to some embodiment, a system for charging EV at an electric vehicle charging station equipped with a number of EVSEs is provided. The system includes a cloud controller and an edge controller. The cloud controller is configured to control the EVSEs to perform charging at least one EV. The edge controller is configured to perform the following procedures. Whether a total power consumption corresponding to the EVSEs is equal or larger than X % of a maximum power capacity is determined. X being a real number between 1 and 100. When the total power consumption corresponding to the EVSEs is equal or larger than X % of the maximum power capacity, amount of power for each EVSE is recalculated and the recalculated amount of power is assigned to each EVSE for charging the at least one EV by the EVSEs under control of the edge controller, which is limited to the X % of maximum power capacity. Charging information of each EVSE is sent to the cloud controller when performing charging the at least one EV by the EVSEs under control of the edge controller.

Although the cloud controller uses prediction engine to predict the behavior of the system load and assign charging profile to each EVSE, the edge controller can track the actual power consumption at local. When any behavior which causes the real time power consumption approaching the power limit occurs, the edge controller will take control and reassign charging profile to each EVSE. In addition, the edge controller provides a shorter latency comparing to the cloud controller because the edge controller is nearer to the EVSEs. Both of the charging by cloud controller and charging by edge controller could use the same or different charging strategies.

Before EV is fully charged and total power consumption is equal or less than X % (for example, 90%), that is, the EV is in charging mode and the total power consumption is less than X %, the charging profile will be taken care by the cloud controller, which may be implemented by a smart charging server. The cloud controller implemented by the smart charging server can consider more parameters as the smart charging server has more powerful computational capability. The edge controller which can be implemented by a normal computer, for example, considers lesser parameters as the edge controller has a limited computational ability.

In the embodiment described above, to minimize or even avoid the cost for infrastructure upgrading, dynamic load management can be introduced by optimizing energy usage and managing load distribution in real-time. Advanced smart charging algorithms are deployed via the edge controller to monitor the energy supply and energy demand, being able to adjust the power allocation optimally in real-time across a number of EVSEs within the available capacity threshold.

According to the embodiment described herein, the method and system for charging EVs at an electric vehicle charging station equipped with multiple EVSEs can execute dynamic load management when power crunch occurs. In such instances, power is re-allocated in some phase to ensure balanced loads across each phase. The method and system for charging EVs at an electric vehicle charging station can prevent strain on the grid infrastructure caused by EV charging, thereby minimizing or eliminating the cost associated with infrastructure upgrades.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A method for charging electric vehicle (EV) at an electric vehicle charging station equipped with a plurality of electric vehicle supply equipments (EVSEs), comprising:

performing charging at least one EV by the EVSEs under control of a cloud controller;

determining whether a total power consumption corresponding to the EVSEs is equal or larger than X % of a maximum power capacity, X being a real number between 1 and 100;

when the total power consumption corresponding to the EVSEs is equal or larger than X % of the maximum power capacity, recalculating amount of power for each EVSE by an edge controller and assigning the recalculated amount of power to each EVSE by the edge controller for charging the at least one EV by the EVSEs under control of the edge controller; and sending charging information of each EVSE to the cloud controller by the edge controller when performing charging the at least one EV by the EVSEs under control of the edge controller;

wherein when the total power consumption corresponding to the EVSEs is not equal or not larger than X % of the maximum power capacity, it means that there is no power crunch and default charging by cloud controller commences until there is a power crunch;

wherein when the total power consumption corresponding to the EVSEs is equal or larger than X % of the maximum power capacity, it means that there is a power crunch and dynamic load management is activated;

wherein in the process of the dynamic load management, charging by the cloud controller is changed to charging by the edge controller, and charging at least one EV by the EVSEs is performed under control of the edge controller;

wherein the maximum power capacity is a maximum power capacity of a grid infrastructure of a grid;

wherein the edge controller is configured to read data from a main power meter and the EVSEs, the main power meter is capable of reading grid information of the grid, the cloud controller is implemented by a server and the edge controller is implemented by a computer, the cloud controller has more computational capability than the edge controller.

2. The method according to claim 1, wherein the EVSEs and a building are provided with power through a power line from the grid, the total power consumption corresponding to the EVSEs is a sum of power consumption for the building and power consumption for the EVSEs or the total power consumption corresponding to the EVSEs is power consumption for the building including power consumption for the EVSEs.

3. The method according to claim 1, further comprising:

obtaining a real-time main meter data from the main power meter when the at least one EV are charged through the EVSEs;

wherein whether the total power consumption corresponding to the EVSEs is equal or larger than X % of the maximum power capacity is determined according to the obtained real-time main meter data from the main power meter, and the main power meter (306) detects import and export of energy for the grid infrastructure at a time interval.

4. The method according to claim 3, wherein the real-time main meter data is related to the total power consumption corresponding to the EVSEs, the real-time main meter data comprises at least one of real-time energy consumption data, voltage levels and current levels of each phase of the power provided by the grid, and energy usage over time, the main power meter is implemented by a digital power meter.

5. The method according to claim 1, wherein in the step of recalculating amount of power for each EVSE by an edge controller and assigning the recalculated amount of power to each EVSE by the edge controller for charging the at least one EV by the EVSEs under control of the edge controller, each EVSE is assigned with power evenly.

6. The method according to claim 1, wherein in the step of performing charging at least one EV by the EVSEs under control of a cloud controller, the cloud controller performs the following steps:

generating a charging prediction data obtained according to a plurality of historical charging data, wherein each historical charging data comprises an actual charging amount and at least one of a stay time of each EV and a charging time of each EV; and obtaining a predicted electricity demand and a predicted stay period of each EV through the charging prediction data.

7. The method according to claim 6, wherein in the step of performing charging at least one EV by the EVSEs under control of a cloud controller, the cloud controller further performs the following steps:

generating a charging schedule, comprising providing each EV with a basic charging power amount; and determining a charging priority of each EV according to the predicted electricity demand and the predicted stay period.

8. The method according to claim 7, wherein in the step of sending charging information of each EVSE to the cloud controller by the edge controller when performing charging the at least one EV by the EVSEs under control of the edge controller, the charging information of each EVSE sent to the cloud controller by the edge controller is used as a new historical charging data used by the cloud controller for generating another charging prediction data for charging the at least one EV by the EVSEs under control of the cloud controller in a next time iteration.

9. The method according to claim 1, wherein the charging information of each EVSE comprises at least one of charging status of each EV, charging power amount of each EV, and time period of stay of each EV.

10. The method according to claim 1, further comprising:

updating a charging profile for each EVSE by generating a new charging profile for each EVSE and sending the new charging profile to each EVSE by the edge controller;

wherein the new charging profile indicates the assigned and recalculated amount of power, or current, for each EVSE.

11. The method according to claim 1, wherein when the total power consumption corresponding to the EVSEs in a particular phase of power is equal or larger than X % of the maximum power capacity, the edge controller recalculates amount of current or power in the particular phase for each particular EVSE which uses current or the power in the particular phase, and assigns the recalculated amount of power in the particular phase to each particular EVSE for charging the at least one EV by the particular EVSEs.

12. A system for charging EV at an electric vehicle charging station equipped with a plurality of EVSEs, comprising:

a cloud controller, configured to control the EVSEs to perform charging at least one EV; and an edge controller, configured to perform the following procedures:

determining whether a total power consumption corresponding to the EVSEs is equal or larger than X % of a maximum power capacity, X being a real number between 1 and 100;

when the total power consumption corresponding to the EVSEs is equal or larger than X % of the maximum power capacity, recalculating amount of power for each EVSE and assigning the recalculated amount of power to each EVSE for charging the at least one EV by the EVSEs under control of the edge controller; and sending charging information of each EVSE to the cloud controller when performing charging the at least one EV by the EVSEs under control of the edge controller;

wherein when the total power consumption corresponding to the EVSEs is not equal or not larger than X % of the maximum power capacity, it means that there is no power crunch and default charging by cloud controller commences until there is a power crunch;

wherein when the total power consumption corresponding to the EVSEs is equal or larger than X % of the maximum power capacity, it means that there is a power crunch and dynamic load management is activated;

wherein in the process of the dynamic load management, charging by the cloud controller is changed to charging by the edge controller, and charging at least one EV by the EVSEs is performed under control of the edge controller;

wherein the maximum power capacity is a maximum power capacity of a grid infrastructure of a grid;

wherein the edge controller is configured to read data from a main power meter and the EVSEs, the main power meter is capable of reading grid information of the grid, the cloud controller is implemented by a server and the edge controller is implemented by a computer, the cloud controller has more computational capability than the edge controller.

13. The system according to claim 12, wherein the EVSEs and a building are provided with power through a power line from the grid, the total power consumption corresponding to the EVSEs is a sum of power consumption for the building and power consumption for the EVSEs or the total power consumption corresponding to the EVSEs is power consumption for the building including power consumption for the EVSEs.

14. The system according to claim 12, the edge controller is further configured to obtain a real-time main meter data from the main power meter when the at least one EV are charged through the EVSEs;

wherein whether the total power consumption corresponding to the EVSEs is equal or larger than X % of the maximum power capacity is determined according to the obtained real-time main meter data from the main power meter.

15. The system according to claim 14, wherein the real-time main meter data is related to the total power consumption corresponding to the EVSEs, the real-time main meter data comprises at least one of real-time energy consumption data, voltage levels and current levels of each phase of the power provided by the grid, and energy usage over time, the main power meter is implemented by a digital power meter, and the main power meter detects import and export of energy for the grid infrastructure at a time interval.

16. The system according to claim 12, wherein in the procedure of recalculating amount of power for each EVSE and assigning the recalculated amount of power to each EVSE for charging the at least one EV by the EVSEs under control of the edge controller, each EVSE is assigned with power evenly.

17. The system according to claim 12, wherein the cloud controller is further configured to performs the following procedures:

generating a charging prediction data obtained according to a plurality of historical charging data, wherein each historical charging data comprises an actual charging amount and at least one of a stay time of each EV and a charging time of each EV; and obtaining a predicted electricity demand and a predicted stay period of each EV through the charging prediction data.

18. The system according to claim 17, wherein the cloud controller is further configured to performs the following procedures:

generating a charging schedule, comprising providing each EV with a basic charging power amount; and determining a charging priority of each EV according to the predicted electricity demand and the predicted stay period.

19. The system according to claim 18, wherein in the procedure of sending charging information of each EVSE to the cloud controller when performing charging the at least one EV by the EVSEs under control of the edge controller, the charging information of each EVSE sent to the cloud controller is used as a new historical charging data used by the cloud controller for generating another charging prediction data for charging the at least one EV by the EVSEs under control of the cloud controller in a next time iteration.

20. The system according to claim 12, wherein the charging information of each EVSE comprises at least one of charging status of each EV, charging power amount of each EV, and time period of stay of each EV.

21. The system according to claim 12, wherein the edge controller is further configured to perform the following procedures:

updating a charging profile for each EVSE by generating a new charging profile for each EVSE and sending the new charging profile to each EVSE;

wherein the new charging profile indicates the assigned and recalculated amount of power, or current, for each EVSE.

22. The method according to claim 12, wherein the edge controller is further configured to perform the following procedures:

when the total power consumption corresponding to the EVSEs in a particular phase of power is equal or larger than X % of the maximum power capacity, recalculating amount of current or power in the particular phase for each particular EVSE which uses current or the power in the particular phase, and assigning the recalculated amount of power in the particular phase to each particular EVSE for charging the at least one EV by the particular EVSEs.

* * * * *